Dec. 1, 1925.
W. M. SUBLETTE
1,564,033
HYDRAULIC POWER TRANSMISSION AND BRAKE
Filed Aug. 11, 1924   3 Sheets-Sheet 2
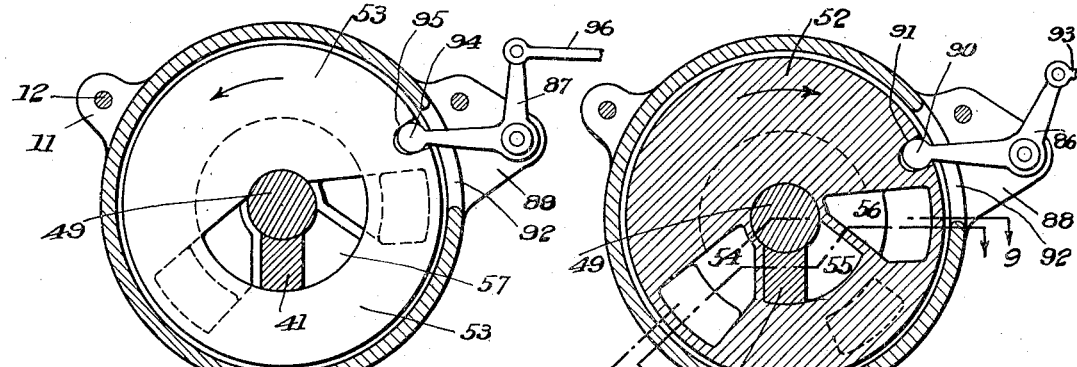
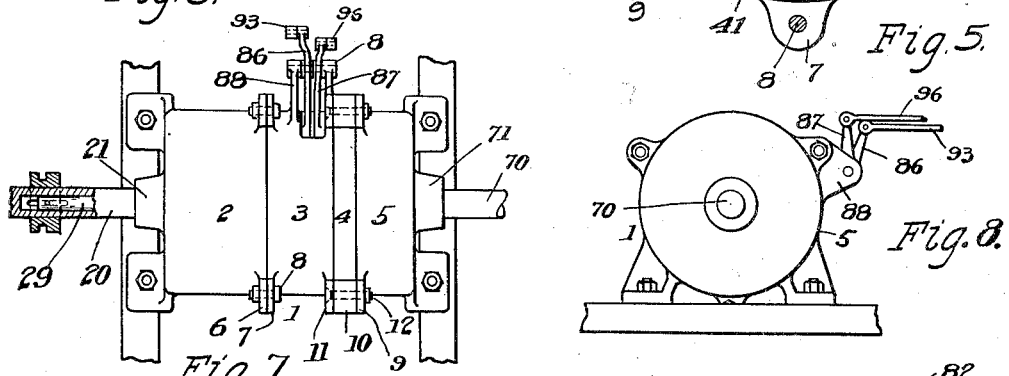
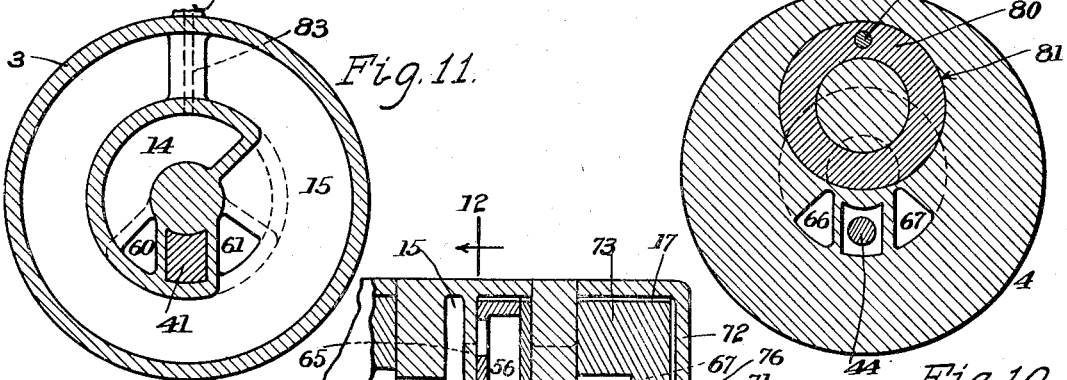
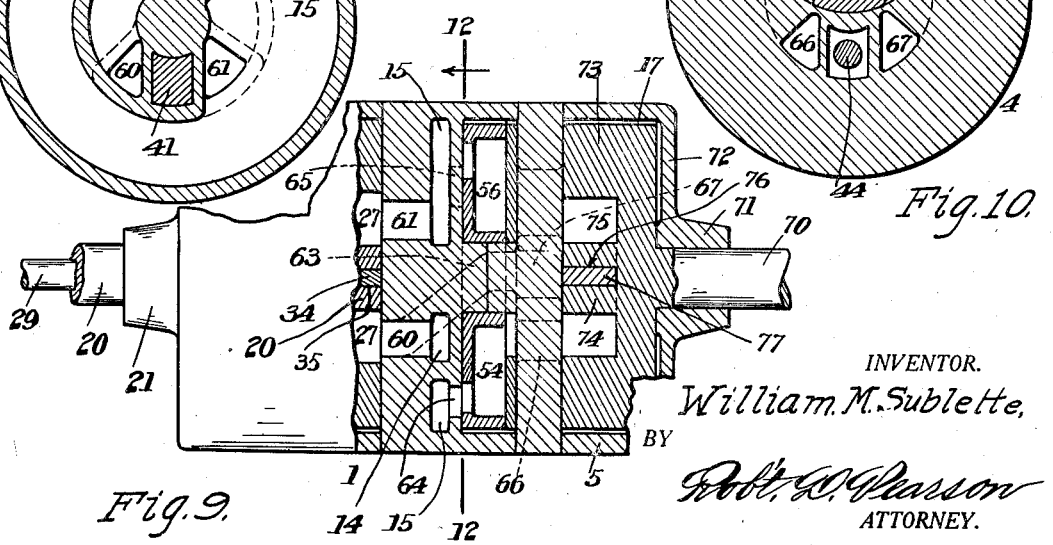
INVENTOR.
William M. Sublette,
BY
Robt. W. Plasson
ATTORNEY.

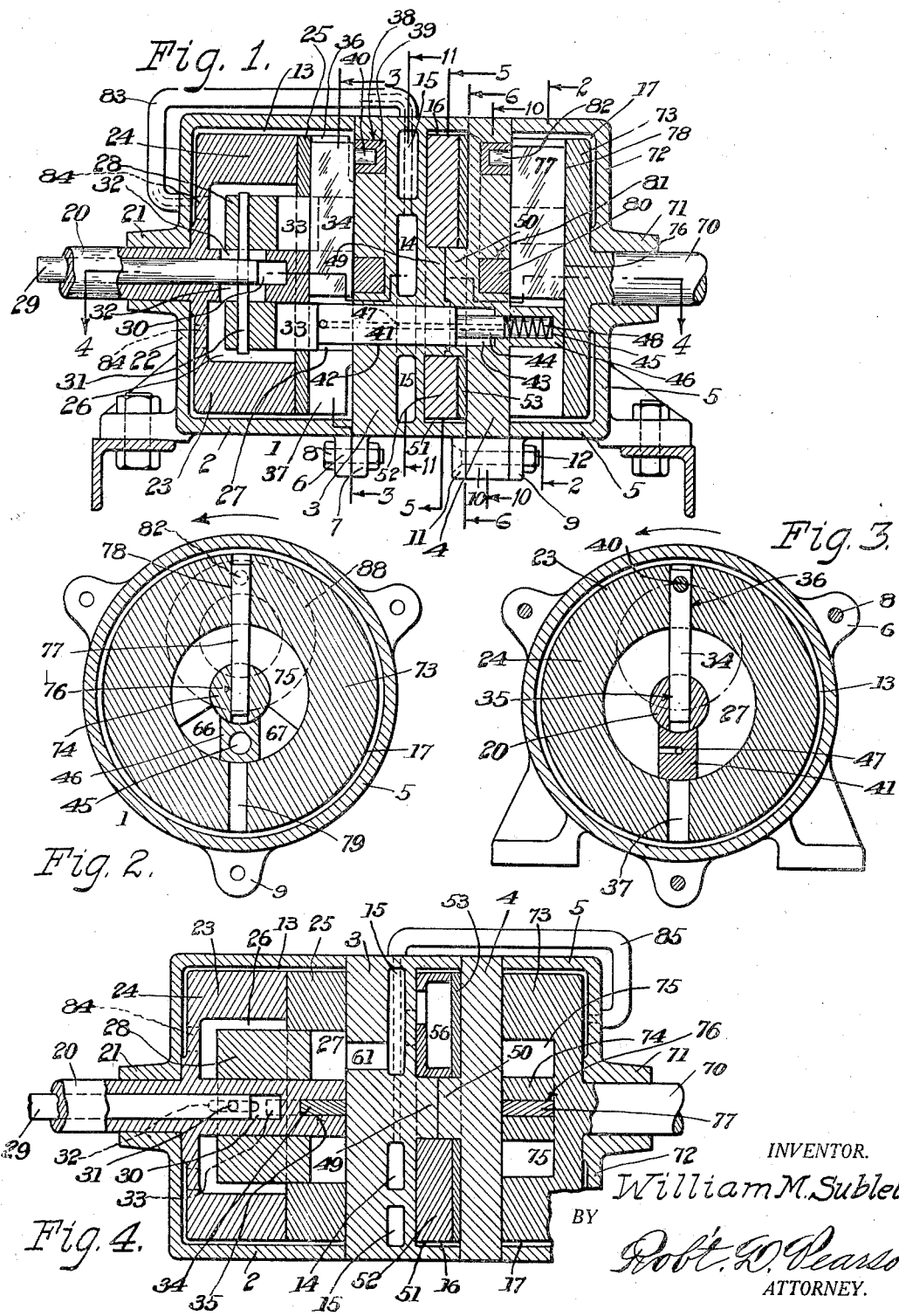

Dec. 1, 1925.

W. M. SUBLETTE

HYDRAULIC POWER TRANSMISSION AND BRAKE

Filed Aug. 11, 1924   3 Sheets-Sheet 3

1,564,033

INVENTOR.
William M. Sublette,
BY Robt. D. Pearson
ATTORNEY.

Patented Dec. 1, 1925.

1,564,033

UNITED STATES PATENT OFFICE.

WILLIAM M. SUBLETTE, OF LOS ANGELES, CALIFORNIA.

HYDRAULIC POWER TRANSMISSION AND BRAKE.

Application filed August 11, 1924. Serial No. 731,453.

*To all whom it may concern:*

Be it known that I, WILLIAM M. SUBLETTE, a citizen of the United States, residing at Los Angeles, in the county of Los Angeles and State of California, have invented certain new and useful Improvements in Hydraulic Power Transmissions and Brakes, of which the following is a specification.

The invention relates to power transmission and more particularly to a hydraulic power transmission device.

The general object of my invention is to provide a hydraulic power transmission device by means of which power may be transmitted at different speeds in either direction.

A more particular object is to provide a power transmission device comprising a brake means whereby the device may be retarded in its transmission of power.

A further object is to provide a device of the character stated which will be positive in its action and highly efficient in operation.

Other objects and advantages will be made manifest in the following specification for an embodiment of the invention illustrated in the accompanying drawings.

Referring to the drawings:

Fig. 1 is a vertical longitudinal section of my invention.

Fig. 2 is a transverse vertical section of my invention taken on line 2—2 of Fig. 1.

Fig. 3 is a transverse vertical section of my invention taken on line 3—3 of Fig. 1.

Fig. 4 is a horizontal section of my invention taken on line 4—4 of Fig. 1.

Fig. 5 is a transverse vertical section of my invention taken on line 5—5 of Fig. 1.

Fig. 6 is a transverse vertical section of my invention taken on line 6—6 of Fig. 1.

Fig. 7 is a plan view of my invention.

Fig. 8 is an end view of my invention.

Fig. 9 is a view of my invention partly in plan and partly in horizontal section taken on line 9—9 of Fig. 5.

Fig. 10 is a transverse section of my invention taken on line 10—10 of Fig. 1.

Fig. 11 is a transverse section of my invention taken on line 11—11 of Fig. 1.

Figure 13:
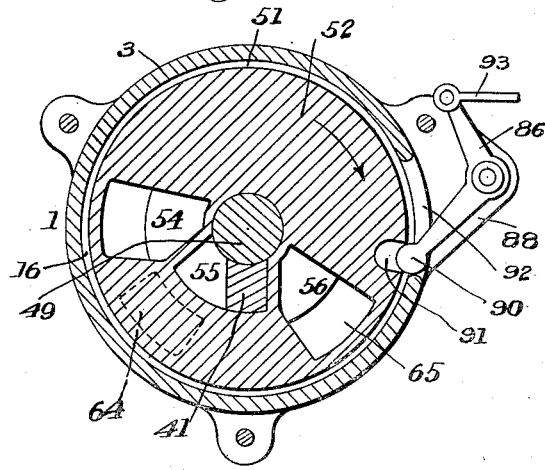
Fig. 13 is a view similar to Fig. 5 showing the valve reversed.
Figure 14:
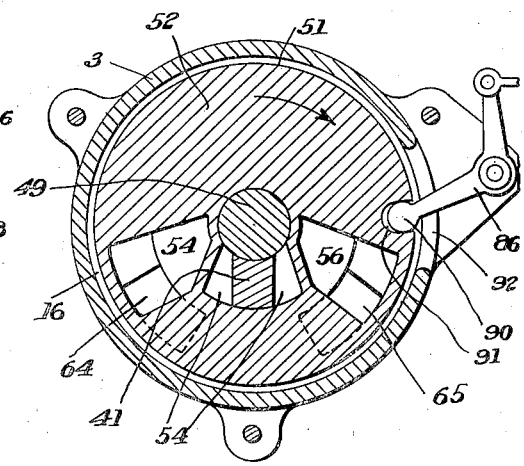
Fig. 14 is a view similar to Fig. 5 showing the valve halfway open and closed or in braking position.
Figure 15:
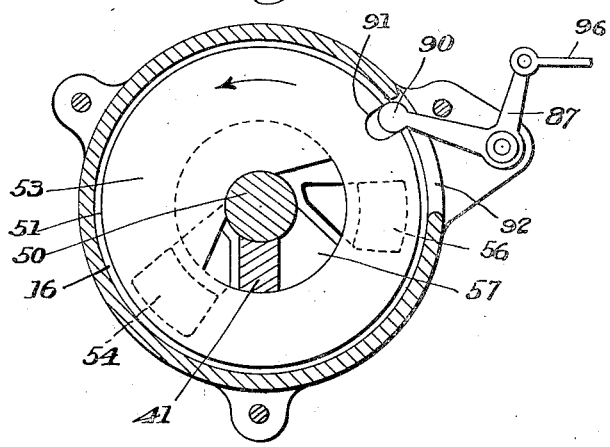
Fig. 15 is a view similar to Fig. 6 showing the brake disk turned partly into braking position.
Figure 12:
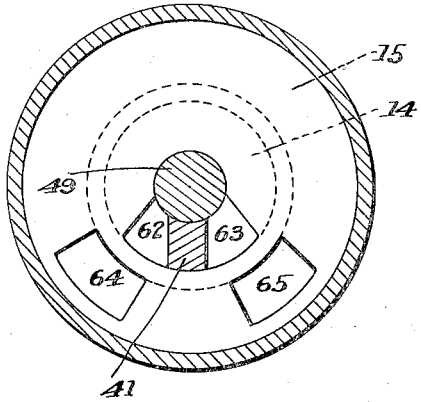
Fig. 12 is a transverse section taken on line 12—12 of Fig. 9.

In the drawings 1 indicates a cylindrical casing closed at both ends and made in four sections 2, 3, 4 and 5. The end section 2 and adjoining section 3 are formed with eyes 6 and 7 which are bolted together by bolts 8 whereby said sections are detachably secured together. The end section 5 is formed with eyes 9 and the sections 4 and 3 are respectively formed with eyes 10 and 11 through which eyes extend bolts 12, whereby said sections are detachably secured together. The section 2 is a shell formed with a rotor chamber 13. The section 3 is formed with two liquid chambers 14 and 15, the chamber 14 being located within the chamber 15, and with a valve chamber 16. The end section 5 is formed with a rotor chamber 17.

A drive shaft 20 is journaled in a bearing 21 on the outer end wall 22 of section 2, which shaft carries a rotor 23 within the chamber 13, the rotor being formed in two sections 24 and 25 which are secured together in any suitable manner. The rotor is formed with two liquid chambers 26 and 27 in which slide a plunger valve 28 which is slidably mounted on the drive shaft 20. A valve operating rod 29 is slidable in an axial bore 30 in the drive shaft 20 and carries in its inner end a pin 31 extending transversely thereof through axial slots 32 in said shaft and through the plunger valve 28, so that upon moving the rod 29 longitudinally in one direction or the other, the valve is correspondingly moved. The valve 28 is provided with diametrical slots 33 to receive a diametrically extending blade 34, which is slidably mounted in a diametrical slot 35, in the inner end of drive shaft 20, to slide into and out of a pair of diametrical slots 36 and 37 respectively in the rotor section 25. In the face of the casing section 3 at the inner end of the chamber 13 is formed a circular groove 38 in which is turnably mounted a ring 39 to which one end of the blade 34 is connected by a pin 40.

A flat sided slidable head 41 is mounted in recesses 42 and 43 of corresponding shape in casing sections 3 and 4 respectively, the forward end of which head normally projects into the lower part of the chamber 27 of rotor 23. A pin 44 slidably projects from the rear end of the head 41 into a bore 45 in a head 46 formed on the casing section 4. An oil duct 47 extends axially through the head 41 and pin 44 and communicates at one end with the rotor chamber 27 (see Fig. 3), and at its other end with the bore 45 (see Fig. 1), through which duct liquid passes from said bore into said chamber to allow the head 41 to be forced out of the chamber 27 by the engagement of the valve 28, with the forward end of the head. A spring 48 is located in the bore 45 for returning the forward end of the head 41 into the rotor chamber 27 when the valve is retracted.

Journals 49 and 50 are formed on the casing sections 3 and 4 and extend axially within the valve chamber 16 with their ends in contact, on which journals is turnably mounted a transmission and brake valve 51, comprising a valve control member 52 and a brake control disk 53, which member and disk are turnably mounted with relation to each other on the studs 49 and 50. The valve member 52 is formed with three ports 54, 55 and 56 while the disk 53 is provided with a single port 57. The head 41 extends through the ports 55 and 57.

The casing section 3 has two ports 60 and 61 which lead from the rotor chamber 27 into the liquid chambers 14 and 15 respectively. Two ports 62 and 63 are provided in section 3 between the liquid chamber 14 and the valve chamber 16. Two ports 64 and 65 are provided between the liquid chamber 15 and the valve chamber 16. The casing section 4 has two ports 66 and 67 leading from the valve chamber 16.

A driven shaft 70 is journaled in a bearing 71 in the end wall 72 of end casing section 5, and a rotor 73 is secured on said driven shaft within the rotor chamber 17. The rotor 73 is formed in its inner side with a hub 74 and with a liquid chamber 75 around said hub which chamber communicates with ports 66 and 67, and the head 46 projects into the lower part thereof. The hub 74 is provided with a diametrical slot 76 through which slides a blade 77, and the rotor 73 is provided with two diametrical slots 78 and 79 into which opposite ends of said blade are alternately projected as the rotor is rotated in the manner hereinafter described. A ring 80 is turnably mounted in a circular groove 81 in the casing section 4 to which ring one end of the blade 77 is connected by a pin 82.

A liquid equalizer pipe 83 connects at its ends to rotor chamber 13 and liquid chamber 14 respectively. The rotor 23 is provided with ports 84 through which liquid passes from chamber 13 into rotor chamber 26 or vice versa. A liquid equalizer pipe 85 connects at its ends to the liquid chamber 14 and rotor chamber 17 respectively.

A pair of bell crank levers 86 and 87 are journaled respectively in brackets 88 and 89 which brackets are secured on casing section 3. One end 90 of lever 86 is rounded and engages a notch 91 in the periphery of valve member 52, the lever extending through a slot 92 in said casing section. The other end of said lever is connected to an operating rod 93. One end 94 of lever 87 is rounded and engages a notch 95 in the periphery of brake disk 53, the lever extending through the slot 92. The other end of the lever 87 is connected to an operating rod 96.

The operation of my invention is as follows:

The casing 1 is filled with a suitable liquid such as oil.

To drive the shaft 70 at full speed forward the valve 28 is drawn by rod 29 from chamber 27 and the valve 51 is turned to the position shown in Figs. 5 and 6. Upon rotation of the drive shaft 20 in the direction of the arrow in Fig. 3, the blade 34 forces oil from rotor chamber 27 through port 60 into chamber 14, through port 63, valve port 55, port 57 in brake disk 53 and port 67 into chamber 75, where the oil forces the blade 77, rotor 73 and driven shaft 70 in the direction of the arrow in Fig. 2 at the same rate of speed as the drive shaft 20, whereupon the oil in said chamber 75 at the opposite side of blade 77 is forced therefrom by blade 77 back through port 66, valve port 54, port 64, chamber 15 and port 61 into chamber 27, filling the chamber 27 back of the advancing blade 34.

Upon moving the valve 28 inwardly the volume of the chamber 27 is reduced and oil is forced from the same through pipe 83 into the chamber 13 and through ports 84 into the rotor chamber 26, while the head 41 is forced from the chamber 27 by the valve against the tension of the spring 48. The reduction of the volume of chamber 27 by the valve 28 reduces the area of the blade 34 acted upon by the oil, while the greater volume of the chamber 75 and the area of the blade 77 acted upon by the oil, remain the same, whereby the speed of the blade 77, rotor 73 and driven shaft 70 are decreased with relation to the drive shaft 20.

To reverse the driven shaft the valve member 52 is turned by the bell crank lever 86 until the port 55 registers with port 63 and with port 66, and the port 56 registers with ports 65 and 67 while the valve member closes the ports 63 and 64. Oil is forced from chamber 27 through port 60 into chamber 14 out through port 62 into valve port 55, through port 66 into rotor chamber 75 where the oil acting upon one side of blade 77 forces said blade, rotor 73 and driven shaft 70 in the direction opposite the arrow indicated in Fig. 2, whereupon the oil in said chamber 75 on the opposite side of the blade 77 is forced from the chamber through port 67, through port 57 in brake disk 53, valve port 56, port 65 into chamber 15, then through port 61 back into rotor chamber 27 on the suction side of blade 34.

To apply the brake the valve member 52 and brake disk 53 are turned respectively clockwise and counter clockwise by means of the levers 86 and 87 through their rods 93 and 96, until the valve port half way opens and closes the port 64, the valve port 55 half way opens and closes the ports 62 and 63 and the ports 66 and 67, and the port 56 half way opens and closes port 65, while the brake disk port 57 gradually closes port 66 and the half way open valve port 55, whereupon the circulation of the oil is gradually decreased and finally shut off through port 66.

While the port 66 is being closed by the brake disk 53 the rotation of driven shaft 70 causes blade 77 to force oil out of chamber 75 through said port 66, brake disk port 57, valve port 55 and half way open port 62 into oil chamber 14 and from said chamber back through half way open port 63, valve port 55 at the opposite side of head 41, brake disk port 57 and port 67 into rotor chamber 75 at the rear side of blade 77. This circulation of the oil is gradually and finally stopped by the closing of port 66 by brake disk 53 whereupon the driven shaft is gradually brought to rest.

When the port 66 is closed and the driven shaft brought to rest, if the drive shaft 20 continues to turn, the blade 34 forces oil out of chamber 27 through port 60 into oil chamber 14, and then through half way open port 63, through valve port 55 and brake disk port 57 and port 67, back through valve port 56 and half way open port 65, into oil chamber 15, and from said chamber through port 61 back into rotor chamber 27 at the rear of blade 34.

Having described my invention I claim:

1. In a device of the character as disclosed, a casing containing liquid, a drive shaft journaled in said casing, a rotor on said drive shaft within said casing, said rotor being provided with a liquid chamber, a blade slidable in said rotor and said drive shaft across said chamber, a head in said chamber, means for reciprocating said blade so that it will escape said head during the rotation of said rotor, a driven shaft journaled in said casing, a rotor on said driven shaft within said casing, said rotor being provided with a liquid chamber, a blade slidable in said rotor and driven shaft across the chamber in said rotor, a head in said rotor chamber, means for reciprocating said blade so that it will escape said head as the driven shaft and rotor are rotated, said casing being provided with passages leading from the liquid chamber in the drive rotor at one side of the drive blade to the liquid chamber in the driven rotor at one side of the driven blade, said casing being provided with passages leading from the liquid chamber in the driven rotor at the other side of the driven blade to the liquid chamber in the drive rotor at the other side of the drive blade.

2. In a device of the character as disclosed, a casing containing liquid, a drive shaft journaled in said casing, a rotor on said drive shaft within said casing, said rotor being provided with a liquid chamber, a blade slidable in said rotor and said drive shaft across said chamber, a head in said chamber, means for reciprocating said blade so that it will escape said head during the rotation of said rotor, a driven shaft journaled in said casing, a rotor on said driven shaft within said casing, said rotor being provided with a liquid chamber, a blade slidable in said rotor and driven shaft across the chamber in said rotor, a head in said rotor chamber, means for reciprocating said blade so that it will escape said head as the driven shaft and rotor are rotated, said casing being provided with passages leading from the liquid chamber in the drive rotor at one side of the drive blade to the liquid chamber in the driven rotor at one side of the driven blade, said casing being provided with passages leading from the liquid chamber in the driven rotor at the other side of the driven blade to the liquid chamber in the drive rotor at the other side of the drive blade, and a valve for varying the size of the chamber in the drive rotor for varying the speed of the driven shaft with relation to the drive shaft.

3. In a device of the character as disclosed, a casing containing liquid, a drive shaft journaled in said casing, a rotor on said drive shaft within said casing, said rotor being provided with a liquid chamber, a blade slidable in said rotor and said drive shaft across said chamber, a head in said chamber, means for reciprocating said blade so that it will escape said head during the rotation of said rotor, a driven shaft journaled in said casing, a rotor on said driven shaft within said casing, said rotor being provided with a liquid chamber, a blade slidable in said rotor and driven shaft across the chamber in said rotor, a head in said rotor chamber, means for reciprocating said blade so that it will escape said head as the driven shaft and rotor are rotated, said casing being provided with passages leading from the liquid chamber in the drive rotor at one side of the drive blade to the liquid chamber in the driven rotor at one side of the driven blade, said casing being provided with passages leading from the liquid chamber in the driven rotor at the other side of the driven blade to the liquid chamber in the drive rotor at the other side of the drive blade, and a valve for reversing the flow of liquid through said passages to and away from the liquid chamber in said driven rotor to reverse the direction of rotation of the driven shaft with relation to the drive shaft.

4. In a device of the character as disclosed, a casing containing liquid, a drive shaft journaled in said casing, a rotor on said drive shaft within said casing, said rotor being provided with a liquid chamber, a blade slidable in said rotor and said drive shaft across said chamber, a head in said chamber, means for reciprocating said blade so that it will escape said head during the rotation of said rotor, a driven shaft journaled in said casing, a rotor on said driven shaft within said casing, said rotor being provided with a liquid chamber, a blade slidable in said rotor and driven shaft across the chamber in said rotor, a head in said rotor chamber, means for reciprocating said blade so that it will escape said head as the driven shaft and rotor are rotated, said casing being provided with passages leading from the liquid chamber in the drive rotor at one side of the drive blade to the liquid chamber in the driven rotor at one side of the driven blade, said casing being provided with passages leading from the liquid chamber in the driven rotor at the other side of the driven blade to the liquid chamber in the drive rotor at the other side of the drive blade, and a valve comprising a valve member and a brake member provided with ports adapted to register with said passages, and means for turning said members to turn said ports in such relation to said passages as to gradually retard and finally prevent circulation of liquid through said driven rotor chamber to brake said driven shaft.

In testimony whereof I affix my signature.

WILLIAM M. SUBLETTE.